(12) United States Patent
Sargsyan et al.

(10) Patent No.: US 11,100,941 B2
(45) Date of Patent: Aug. 24, 2021

(54) SPEECH ENHANCEMENT AND NOISE SUPPRESSION SYSTEMS AND METHODS

(71) Applicant: 2Hz, Inc., Berkeley, CA (US)

(72) Inventors: Stepan Sargsyan, Yerevan (AM); Artavazd Minasyan, Yerevan (AM)

(73) Assignee: Krisp Technologies, Inc., Berkeley, CA (US)

( * ) Notice: Subject to any disclaimer, the term of this patent is extended or adjusted under 35 U.S.C. 154(b) by 180 days.

(21) Appl. No.: 16/547,356

(22) Filed: Aug. 21, 2019

(65) Prior Publication Data

US 2020/0066296 A1 Feb. 27, 2020

Related U.S. Application Data

(60) Provisional application No. 62/720,702, filed on Aug. 21, 2018.

(51) Int. Cl.
| | | |
|---|---|---|
| G10L 21/00 | (2013.01) | |
| G10L 21/0232 | (2013.01) | |
| G06F 17/16 | (2006.01) | |
| G06F 17/14 | (2006.01) | |
| G10L 25/30 | (2013.01) | |

(52) U.S. Cl.
CPC ........ *G10L 21/0232* (2013.01); *G06F 17/142* (2013.01); *G06F 17/16* (2013.01); *G10L 25/30* (2013.01)

(58) Field of Classification Search
CPC .......... G06N 3/08; G06N 3/0454; G06N 3/02; G06N 3/0481; G06N 7/005; G06N 3/04; G10L 25/30; G10L 15/16; G10L 15/063; G10L 21/0232; G10L 25/84; G10L 17/04; G10L 17/18; G10L 21/0272; G10L 21/038; G10L 19/16
See application file for complete search history.

(56) References Cited

U.S. PATENT DOCUMENTS

| | | | | |
|---|---|---|---|---|
| 9,245,538 | B1* | 1/2016 | Avendano | G10L 21/0208 |
| 2003/0044024 | A1* | 3/2003 | Aarts | G10L 21/038 |
| | | | | 381/61 |
| 2009/0198498 | A1* | 8/2009 | Ramabadran | G10L 21/038 |
| | | | | 704/500 |
| 2010/0198587 | A1* | 8/2010 | Ramabadran | G10L 21/038 |
| | | | | 704/205 |

(Continued)

OTHER PUBLICATIONS

J. Kontio, L. Laaksonen and P. Alku, "Neural Network-Based Artificial Bandwidth Expansion of Speech," in IEEE Transactions on Audio, Speech, and Language Processing, vol. 15, No. 3, pp. 873-881, Mar. 2007. (Year: 2007).*

(Continued)

*Primary Examiner* — Edgar X Guerra-Erazo

(74) *Attorney, Agent, or Firm* — David R. Stevens; Stevens Law Group

(57) ABSTRACT

Example speech enhancement and noise suppression systems and methods are described. In one implementation, a method receives an audio file comprising a combination of voice data and noise data, and divides the audio file into multiple frames. The method performs a discrete Fourier transform on each frame of a first subset of the multiple frames to provide a plurality of frequency-domain outputs, which are input to a neural network. A ratio mask is obtained as an output from the neural network and clean voice coefficients are computed using the ratio mask. The method outputs an audio file having enhanced speech based on the computed clean voice coefficients.

20 Claims, 16 Drawing Sheets

(56) References Cited

U.S. PATENT DOCUMENTS

| | | | | |
|---|---|---|---|---|
| 2011/0054885 | A1* | 3/2011 | Nagel | G10L 21/038 704/203 |
| 2016/0111107 | A1* | 4/2016 | Erdogan | G10L 21/0208 704/226 |
| 2017/0061978 | A1* | 3/2017 | Wang | G10L 21/0232 |
| 2017/0236526 | A1* | 8/2017 | Choo | G10L 25/21 704/208 |
| 2019/0122679 | A1* | 4/2019 | Nagisetty | G10L 19/24 |
| 2019/0122689 | A1* | 4/2019 | Jain | H04R 3/005 |
| 2019/0318755 | A1* | 10/2019 | Tashev | G10L 25/84 |

OTHER PUBLICATIONS

N. Shah, H. A. Patil and M. H. Soni, "Time-Frequency Mask-based Speech Enhancement using Convolutional Generative Adversarial Network," 2018 Asia-Pacific Signal and Information Processing Association Annual Summit and Conference (APSIPA ASC), Honolulu, HI, USA, 2018, pp. 1246-1251. (Year: 2018).*

J. Valin, "A Hybrid DSP/Deep Learning Approach to Real-Time Full-Band Speech Enhancement," 2018 IEEE 20th International Workshop on Multimedia Signal Processing (MMSP), Vancouver, BC, Canada, 2018, pp. 1-5. (Year: 2018).*

L. Laaksonen, J. Kontio and P. Alku, "Artificial bandwidth expansion method to improve intelligibility and quality of AMR-coded narrowband speech," Proceedings. (ICASSP '05). IEEE International Conference on Acoustics, Speech, and Signal Processing, Philadelphia, PA, USA, 2005, pp. I/809-I/812 vol. 1 (Year: 2005).*

M. H. Soni and H. A. Patil, "Effectiveness of ideal ratio mask for non-intrusive quality assessment of noise suppressed speech," 2017 25th European Signal Processing Conference (EUSIPCO), Kos, 2017, pp. 573-577. (Year: 2017).*

* cited by examiner

SPEECH ENHANCEMENT AND NOISE SUPPRESSION SYSTEMS AND METHODS

RELATED APPLICATION

This application claims the priority benefit of U.S. Provisional Application Ser. No. 62/720,702, entitled "Speech Enhancement and Noise Suppression Systems and Methods," filed on Aug. 21, 2018, the disclosure of which is hereby incorporated by reference herein in its entirety.

TECHNICAL FIELD

The present disclosure relates to speech enhancement and noise suppression, and more particularly to speech enhancement and noise suppression using a deep neural network.

BACKGROUND

Communication devices intended to relay speech audio often relay background noise in addition to the speech. The noise may prevent a listener at the other end of the communication line from being able to hear or understand the speech. Further, the noise may prevent speech recognition software from correctly identifying the speech audio. Accordingly, speech enhancement and bandwidth enhancement devices are used to remove noise and improved the quality of speech audio. However, existing speech enhancement systems use frequency band features, instead of per-frequency features, to process the audio, resulting in an audio signal that still includes noise features. Thus, systems and methods are required for speech enhancement and noise suppression.

SUMMARY

According to some embodiments, a method of speech enhancement includes receiving an audio file comprising a combination of voice data and noise data; dividing said audio file into a plurality of frames; performing a discrete Fourier transform on each frame of a first subset of said plurality of frames to provide a plurality of frequency-domain outputs; inputting said plurality of frequency-domain outputs of said discrete Fourier transform and a noise model approximation to a neural network; obtaining a ratio mask as an output from said neural network; computing clean voice coefficients using said ratio mask; and outputting an audio file having enhanced speech and suppressed noise based on said computed clean voice coefficients. The neural network contains a structure and parameters based on a previous training using predefined noise data and clean speech data to result in a known ratio mask.

A method of bandwidth expansion according to some embodiments includes receiving an audio file comprising a combination of voice data and noise data having a first bandwidth; dividing said audio file into a plurality of frames; for a first frame of said plurality of frames, performing a bandwidth expansion process comprising: performing a fast Fourier transform to obtain audio features corresponding to the combination of voice data and noise data; obtaining a power spectrum of the audio features; inputting the power spectrum to a neural network; determining a phase of the audio features; constructing a frequency spectrum having a second bandwidth based on an output of the neural network and the determined phase, the second bandwidth being greater than the first bandwidth; and taking an inverse fast Fourier transform of the frequency spectrum to provide an audio signal; repeating said bandwidth expansion process for a subsequent frame of said plurality of frames; and outputting an audio file having the second bandwidth based on the audio signals for the plurality of frames.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

Figure 1:
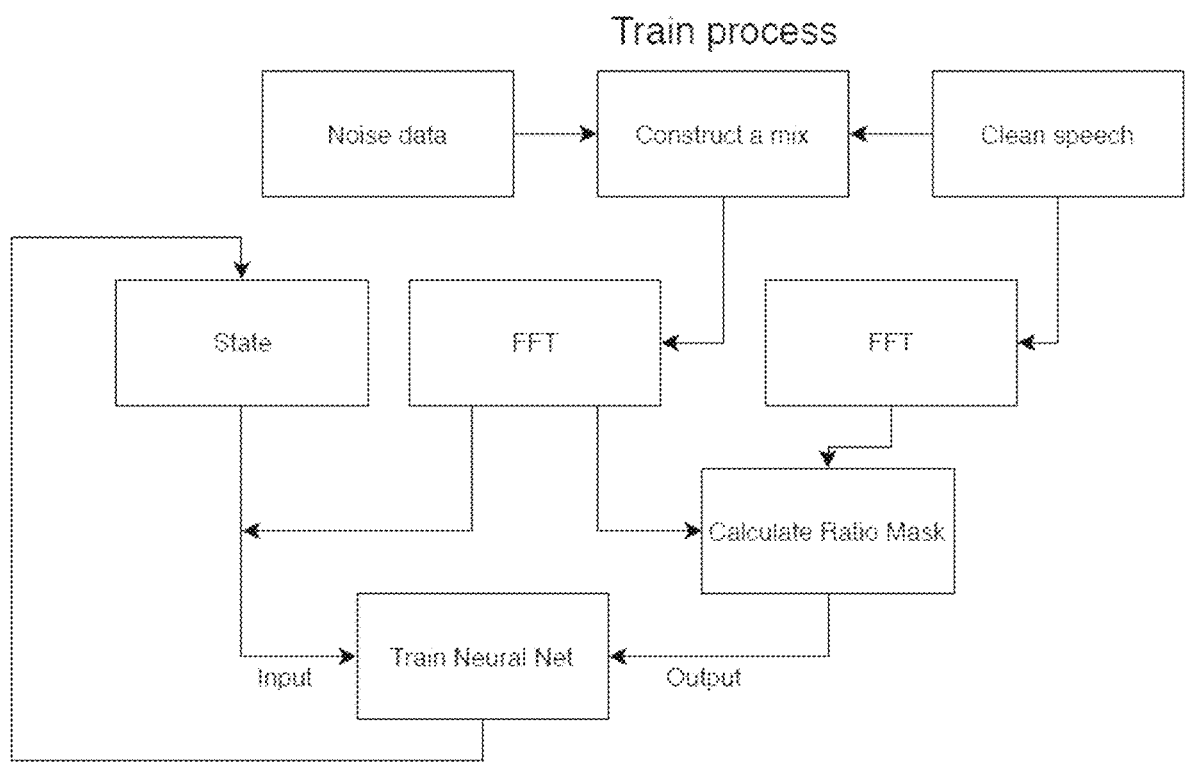
FIGS. 1 and 2 show flow charts for recursive noise cancellation according to some embodiments.
Figure 2:
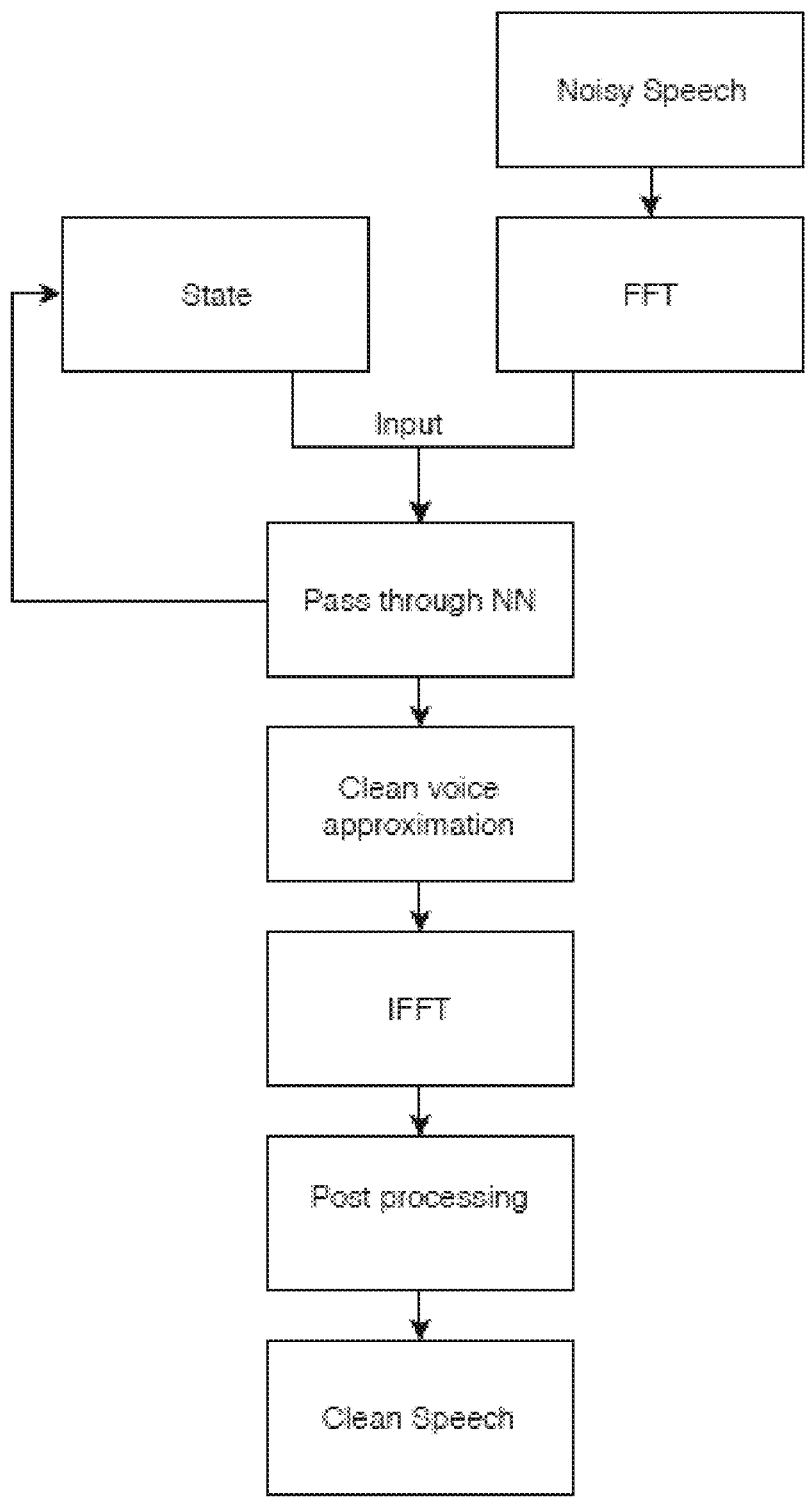
Figure 3:
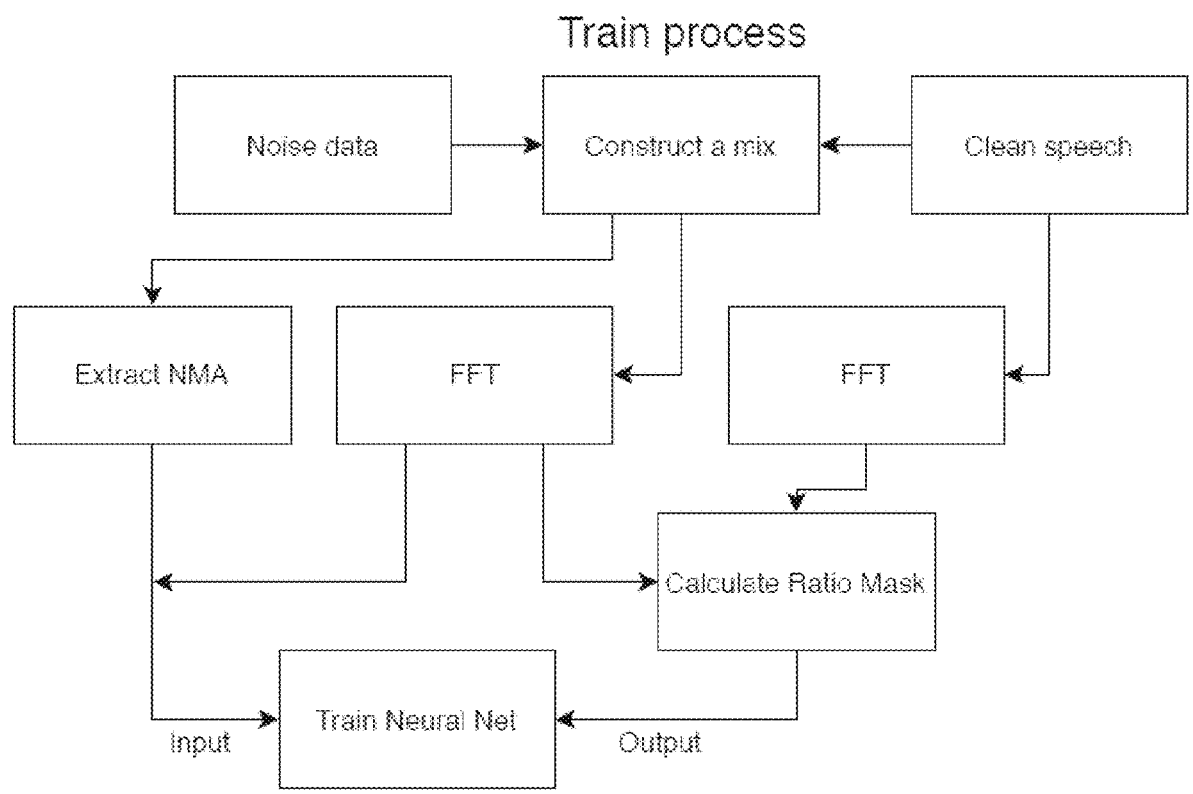
FIGS. 3 and 4 show flow charts for recursive noise model approximation (NMA) according to some embodiments.
Figure 4:
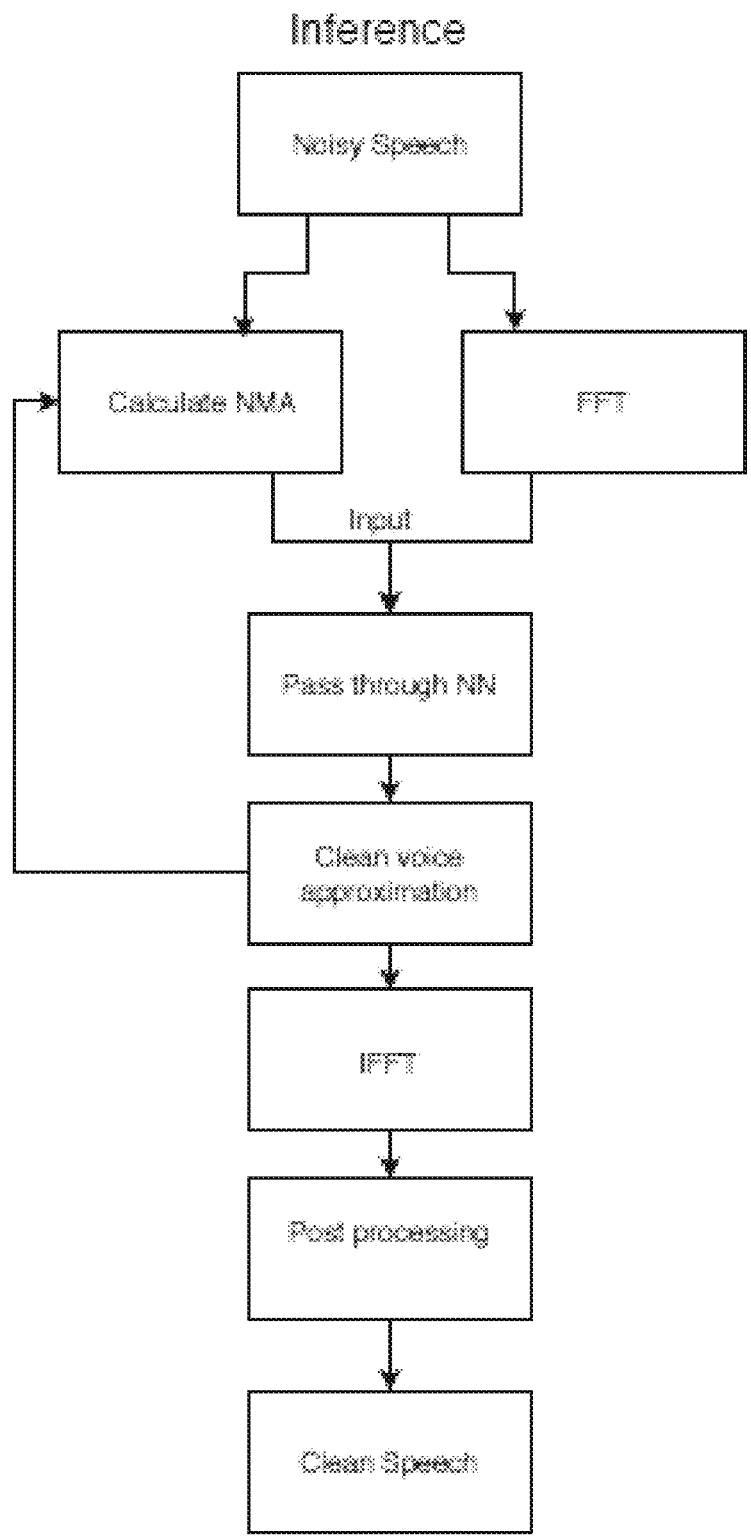

In the following disclosure, reference is made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter is described in language specific to structural features and/or methodological acts, it is to be understood that the subject matter defined in the appended claims is not necessarily limited to the described features or acts described herein. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

At least some embodiments of the disclosure may be directed to computer program products comprising such logic (e.g., in the form of software) stored on any computer useable medium. Such software, when executed in one or more data processing devices, causes a device to operate as described herein.

Embodiments of the described systems and methods are directed to speech enhancement, noise suppression, and bandwidth expansion. The system and methods can be used for server-side processing of audio files, server-side real time processing during conference calls, phone calls, etc., and client-side real time processing. In some embodiments, a driver is installed on a device and noise cancellation is being applied on an input and/or output audio stream in the device itself. The described system and methods can be used to clean noise in calls such as a business call, meetings, personal calls, etc. A call can be placed from anywhere (coffee shop, home, street, airport, etc.) and the person on the other end of the line will get only the caller's clean speech. The systems and methods disclosed herein will remove background noise including restaurant, street, rain/wind noise, or a baby's screaming. The systems and methods can clean noise in incoming calls. For example, the technology can clean background noise coming from the caller's side.

The methods and systems disclosed herein can be provided as an online service which receives audio or video file, cleans it from background noise and returns the resulting file back. This can be implemented in the form of an API or an end-user service. The files can be call messages, podcasts, YouTube videos or personal audio/videos captured by publishers.

The methods and systems disclosed herein can be provided as a noise cancellation mobile application which allows users to noise cancel their captured audio and video before saving on their handset or uploading to the internet. The methods and systems can be integrated into audio/video editing tools to make it possible to clean noise in the audio. The technology can also be used in call centers to allow customers to listen only to the voice of the operator they are talking with. The methods and systems can further be used for noise robust automatic speech recognition (a.k.a. speech to text), and for improved machine understanding of intents in human speech (Alexa, Google Home, etc.).

The methods and systems according to some embodiments can be used to expand low bitrate audio (e.g., 8 kHz) in conference calls on the server side and make it so that people calling in from low bitrate cellular lines sound much richer for other participants in the call (from 16 kHz to 44.1 kHz). The methods and systems can also be used to expand low bitrate audio (e.g., 8 kHz) on user device so that audio can be sent in low bandwidth mode and then expanded on the other end (from 16 kHz to 44.1 kHz), thereby saving network traffic.

The methods and systems can be used to process audio containing originally sampled both low bitrate and high bit rate voices, detect the low bitrate voice in the audio, and expand it to high bit rate. In the end, the full audio will sound like it was all high bitrate.

Both noise cancellation and bandwidth expansion can be implemented as a media server (Asterisk, Freeswitch, etc.) plugin running on servers, an API Server, SDK running inside an App on end device (phone, laptop, tablet, internet of things (IoT) device), and inside hardware chip integrated into laptop, phone, headset, microphone or IoT device.

According to some embodiments, noise suppression models are provided. A recursive noise model according to some embodiments involves the following steps, shown for example in FIGS. 1-4. In some embodiments, the described systems and methods take several overlapped frames of noisy speech, compute Fourier coefficients of each frame, and take logarithms of absolute values of the coefficients. The systems and methods then concatenate them with a noise model and take as an input for a neural network (NN). As an output, the systems and methods generate a ratio mask (absolute values of clean voice coefficients divided to noisy voice coefficients). Then, clean voice coefficients are computed using ratio masks and update the noise model. Noise model updates are implemented using, for example, the past 20 frame noise feature approximations by taking the mean.

In the NN model, linear weights are used along with nonlinear weights. Particularly, passing from a previous layer to the next, the systems and methods use another linear transformation with another (independent) parameters and add to the nonlinear part in addition to using linear transformation and applying ReLU (nonlinear part). During inference the systems and methods get a noise model, for example, in the following way. The systems and methods use the NN output (ratio mask) and apply it to the current frame, which gives the noise approximation in that frame. Then, the noise list is updated, adding a new approximation and removing a last approximation to generate a current noise model with averaging noise list. After that, the systems and methods use the new noise model as input to the NN in order to obtain a more precise output for the next frame.

A custom voice activity detection (VAD) model (see, for example FIGS. 7 and 8) differs with respect to recursive NMA model in that as an output of this model's NN the systems and methods get both ratio mask and voice activity detection (VAD) features. The noise model is updated using the successive frames having 0 as a VAD output.

In some embodiments, the NN takes a noise model as input and along with a ratio mask gives VAD as output. Using this structure the systems and methods update the noise model by taking the previous several frames having 0 as VAD output.

A multitask recursive NMA model (see, for example, FIGS. 5 and 6) differs with respect to the recursive NMA model in that this model is trained using a multitask training technique (which is known as a promising way of NN training). As a second task of NN, the systems and methods take computing VAD. This model further enhances the innovation of recursive NMA by combining it with multitask learning.

A multi sample rate (SR) model (see, for example, FIGS. 9 and 10) handles audios for all sample rates. The input of the NN is computed using bark scale band features, and the output is a band ratio mask obtained from band coefficients. A full ratio mask is obtained from the band ratio mask using band functions as an approximation tool. This model can handle all possible sample rates with just one NN, which works with frequency bands and has linear weights feature.

In the bandwidth expansion models (see, for example, FIGS. 13 and 14) according to some embodiments, 8 kHz sampled audio is converted to 16 kHz while human voice frequencies are predicted from 4k to 8k. This allows resampled recordings to sound like original 16 kHz. As an input to the NN, the systems and methods give log-power spectrum of Fourier coefficients of 7 overlapping frames of narrow band audio. As an output, the systems and methods give log-power spectrum of one original wide band frame. In some embodiments, the systems and methods use the following architectures for NN:

i) 3 hidden layer fully connected DNN, where in one case an output layer predicts both narrow and upper band components, while in another, only the upper band.

ii) Convolutional network with 4 downsampling cony layers and 4 upsampling de-conv like layers with skip connections. As input, it gets cubic interpolated 8 kHz audio.

Unlike existing models, the bandwidth expansion model according to some embodiments achieves bandwidth expansion with a NN having linear weights. It predicts only the upper band and adds to it the spline interpolated narrow band signal. The model includes an autoencoder for bandwidth expansion where the middle layer is trained to be close to the original narrowband audio. The model also provides noise robust bandwidth expansion (using NAT and VAD during the training process), has a recurrent net structure, computes loss after (interpolation+NN prediction), and computes loss across all .wav frames, then taking the mean of that and uses it for a single gradient update.

For noise suppression models, post processing tools include a moving average rescaling. The systems and methods compute the average energy of a signal, which changes in time. The systems and methods then multiply successive frames with the scale coefficient, in order to scale the energy of the signal to the target energy. Post processing tools also include ratio mask modification. Instead of using the output of NN, the systems and methods smoothen it, supplying linear approximation in case of low SNRs and quadratic approximation in case of high SNR.

For bandwidth expansion models, post processing tools include mean based upsampling. The systems and methods upsample audio with following method. Between every 2 data points the systems and methods put the average of those points. It produces upsampling by a factor of 2.

A model according to one embodiment is a deep NAT neural network working with Relu and linear combined activation, using several frames features of 8,000 Hz sampling rate audio, normalized with speech moments in input, ratio mask as output, trained on >100 hours train data, using 12 loss functions. The current model is increasing PESQs by 0.6 in average from 1.9 to 2.5. In some cases, PESQ can be improved by 1.4, i.e., from 2.1 to 3.5.

The following description uses specific values for the number of frames included in a group of frames, the length of the frames, and the overlap between the frames. These numbers are examples only, and are provided to elucidate concepts of the described systems and methods. However, other numbers of frames, lengths of frames, and overlap between the frames may be used to practice the described systems and methods.

Recursive NMA (See, for Example, FIGS. 1-4)

According to some embodiments, the systems and methods first create a training data set in the following way. The systems and methods have data of various noise recordings and data of various clean speech recordings. For example, each data set may be in ".wav" extension format, though other formats can also be used. At each step of training data creation (see train process in chart), the systems and methods take a randomly picked noise recording and a randomly picked speech recording, and extract raw data of these audios. The level of noise is randomly changed, and sum of the speech data and the noise data in order to create mix data.

Then, the systems and methods take a randomly picked piece of the mix data, and takes the corresponding piece of clean speech data. In an example embodiment, these pieces contain 7 overlapped 32 ms (this parameter can be pre-defined in a range of 20-40 ms, for example) frames each (the overlapping rate in this example is 50%). Then, the systems and methods take all 7 overlapped frames both for mixture and clean speech pieces, multiply each frame with a window function, and apply a Fast Fourier transform (FFT) to obtain Fourier coefficients that correspond to each frame. In one example, each frame has 126 Fourier coefficients. Thus, each frame of the randomly picked piece of the mix data has 126 Fourier coefficients, and each frame of the corresponding piece of clean speech data 126 Fourier coefficients.

The systems and methods take the amplitudes of the obtained Fourier coefficients, and calculate a ratio mask $\vec{r}$ for the last frame. For example, if the randomly picked piece of the mix data includes 7 overlapped frames, the ratio mask $\vec{r}$ is calculated for the last frame of the 7 overlapped frames. The ratio mask is calculated using the following formula:

$$\sqrt{\frac{s^2}{s^2 + (m-s)^2}}$$

where the s and m are the amplitudes of speech and mix coefficients respectively.

In the example of each frame having 126 coefficients, a value $r_i$ of the ratio mask $\vec{r}$ corresponding to the ith frequency is calculated according to the following equation.

$$r_i = \sqrt{\frac{s_i^2}{s_i^2 + (m_i - s_i)^2}}$$

where $s_i$ is the amplitude of the Fourier coefficient of the clean speech data corresponding to the ith frequency, and $m_i$ is the amplitude of the Fourier coefficient of the mix data corresponding to the ith frequency. Thus, the ratio mask vector $\vec{r}$ has a value for each discrete frequency domain obtained by discrete Fourier transform. In this example, the ratio mask vector has a dimension of 1×126.

The ratio mask vector is kept as the output for the neural network (NN).

Next, the systems and methods calculate the input for the NN. Initially, the systems and methods calculate the logarithm of the amplitudes of the Fourier coefficients for each frame of the randomly picked piece of the mix data. This gives the log power spectrum (LPS) features of the mix data. The LPS features for each frame have a dimension of 1×126 in this example. The features for the 7 frame in the randomly picked piece of the mix data are combined to form a matrix of dimension 7×126. This matrix will be combined with the noise model approximation (NMA) to create the input for the NN.

To calculate the NMA, the systems and methods take the first several overlapped frames of the mix data. In one example, the systems and methods take the first 10 frames (i.e., 0 ms to 176 ms in overlapping frames of 32 ms with 50% overlap). The randomly picked piece of the mix data described above as having 7 frames may or may not overlap with the first 10 overlapped frames of mix data.

The first several overlapped frames of mix data are selected and calculate the LPS features in the same manner as described above. Next, the systems and methods take the mean of the LPS features of the first several overlapped frames. For example, for each discrete frequency i, add together the $i^{th}$ LPS feature of the 10 frames, and then divide by 10. This process is repeated for each of the 126 discrete frequencies. The result is a vector of dimension 1×126. This vector is the NMA.

The systems and methods then add the matrix comprising the LPS features of mix data with NMA and take the obtained matrix as input to NN. For example, the 7×126 matrix comprising the LPS features of mix data is combined with the 1×126 NMA and to obtain an 8×126 matrix. This matrix is input to the NN during training.

NN Architecture (NN with Linear Weights):

The systems and methods use a dense deep NN, with a rectified linear unit (ReLU) as a nonlinearity activation function. The mapping of NN hidden layers from previous to next is done in the following manner. First, multiply the previous hidden layer with parameters (so called nonlinear weights) and take ReLU, thus obtaining the nonlinear part of mapping. The systems and methods then multiply the previous layer with other parameters (so called linear weights) and obtain the linear part of mapping. By summing up the linear and nonlinear parts the systems and methods get the eventual mapping. Combining the nonlinearity activation function with the linear weights prevents loss of information due to the non-linearity. Information is maintained using the linear weights.

The systems and methods further train the NN using a gradient descent algorithm and mean square error as a loss function for our optimization problem.

Inference:

During inference (see test process in accompanying drawings) the systems and methods process noisy speech audio to obtain speech enhancement. The noisy speech audio can be audio that has not previously been used in training the NN. To achieve speech enhancement, the systems and methods proceed in the following manner (recursive approach).

First, create the input matrix that will be input to the NN. This is done by taking the ratio mask predicted by NN for the previous frame and multiplying it by the amplitudes of the Fourier coefficients of the previous frame of the noisy speech audio. In one example, the previous frame is 50% overlapping frame with current frame. The result of the multiplication is a 1×126 vector.

Then, the systems and methods take the logarithm and obtain the clean speech features. Further, the systems and methods use the ratio mask to get a noise model (approximation of noise LPS features) for the previous frame. To get the noise model, multiply each Fourier coefficient $m_i$ of noisy speech with $(1-r_i)$ and this gives the Fourier coefficient of noise $n_i$, where $r_i$ is the corresponding value of the ratio mask for the corresponding Fourier coefficient. This operation is performed for all coefficients (in this case, 126 coefficients for each frame).

The noise model approximation is then updated. To do this, the newly calculated noise model is added to the noise model for a previous number of frames, and then each coefficient is divided by the number of frames. For example, if 10 frames are used to calculate the noise model approximation, the coefficients of the newly calculated noise model (dimension 1×126) are added to the corresponding coefficients of the noise models for the previous 9 frames (each having dimension 1×126), and then the sum is divided by 10 to give the updated noise model approximation (dimension 1×126).

The noise model approximation is combined with LPS features of the current frame and the previous 6 overlapping frames of audio data, and the resulting matrix is the input vector for the NN. For example, the 1×126 noise model approximation is combined with LPS features of the current frame (1×126) and the previous 6 overlapping frames of audio data (6×126), and the 8×126 resulting matrix is the input vector for the NN.

As an output, the systems and methods generate the ratio mask for the current frame. Modifying this ratio mask with special smoothing functions, it is multiplied with amplitudes of current frame's Fourier coefficients. This gives the approximation of amplitudes of Fourier coefficients of voice. Taking the inverse Fourier transform of the approximation of amplitudes, creates the approximation of the voice data for the current frame. The systems and methods use the overlap-add method to obtain the time domain approximation of clean speech contained in the noisy audio. Using overlapping frames maintains continuity between the frames, and prevents information at the edges of the frames from being lost.

Figure 5:
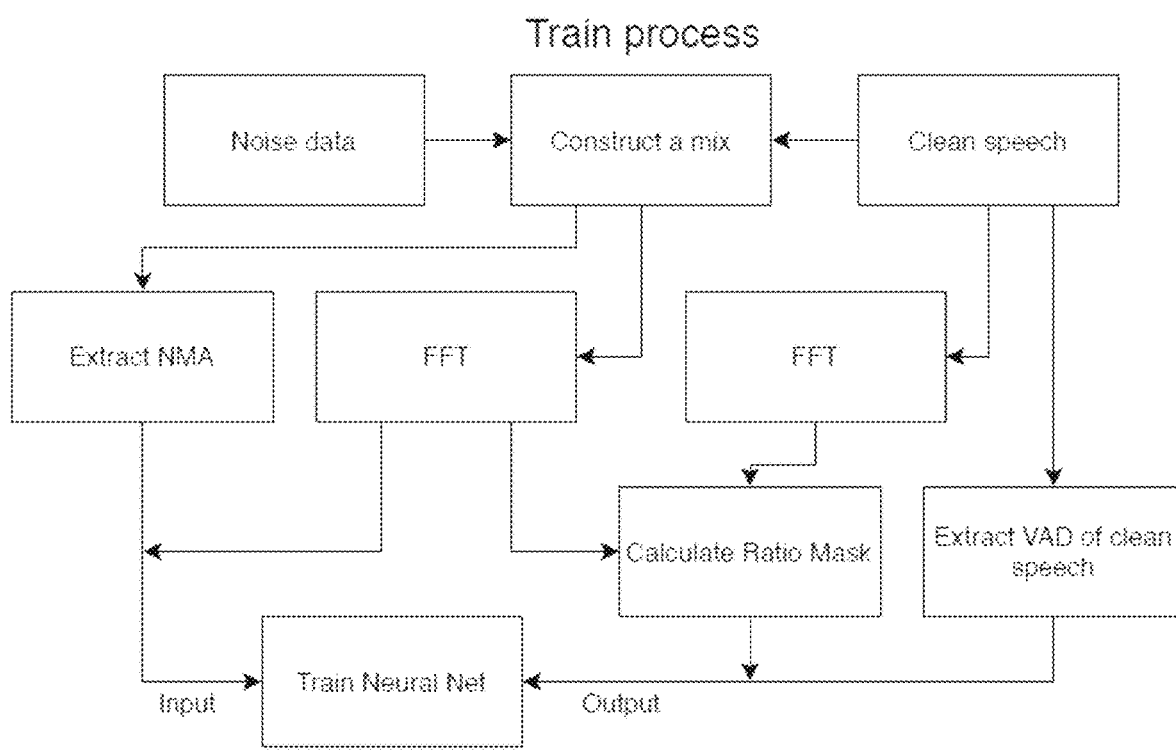
FIGS. 5 and 6 show flow charts for multitask recursive noise model approximation according to some embodiments.
Figure 6:
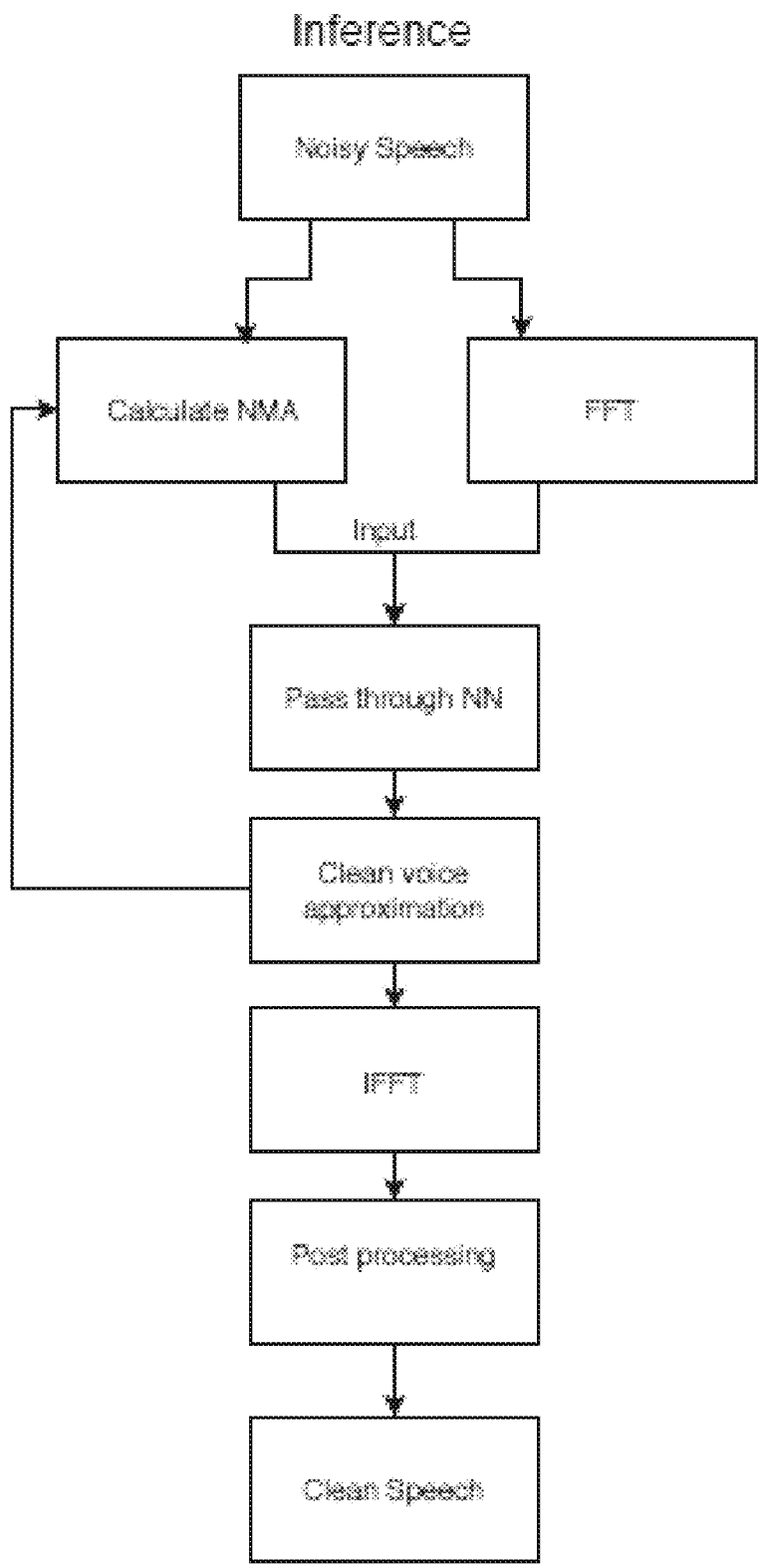

2) Multitask Recursive NMA (See, for Example, FIGS. 5 and 6).

A difference between this model and previous one is that here the systems and methods take a VAD (voice activity detection) feature for each frame of the mix along with respective ratio mask features. VAD takes two arguments 0 and 1, VAD=0 means no voice is present in the current frame, VAD=1 means there is a voice activity in the current frame.

Thus, the systems and methods obtain more optimal training with the help of the multitask learning technique of NN training. Here the systems and methods don't use the VAD output feature during inference.

Figure 7:
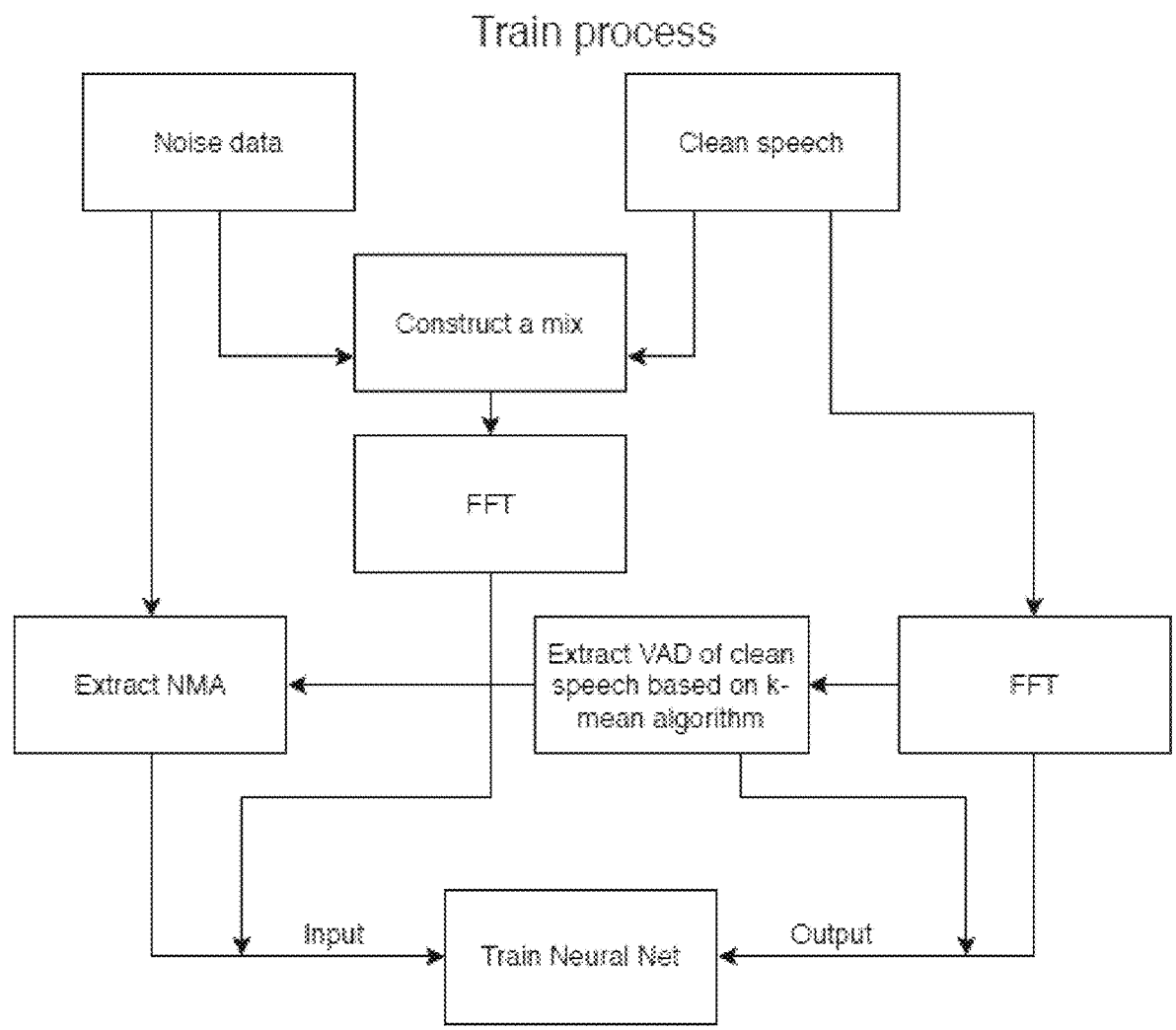
FIGS. 7 and 8 show flow charts for a custom voice activity detection (VAD) model according to some embodiments.
Figure 8:
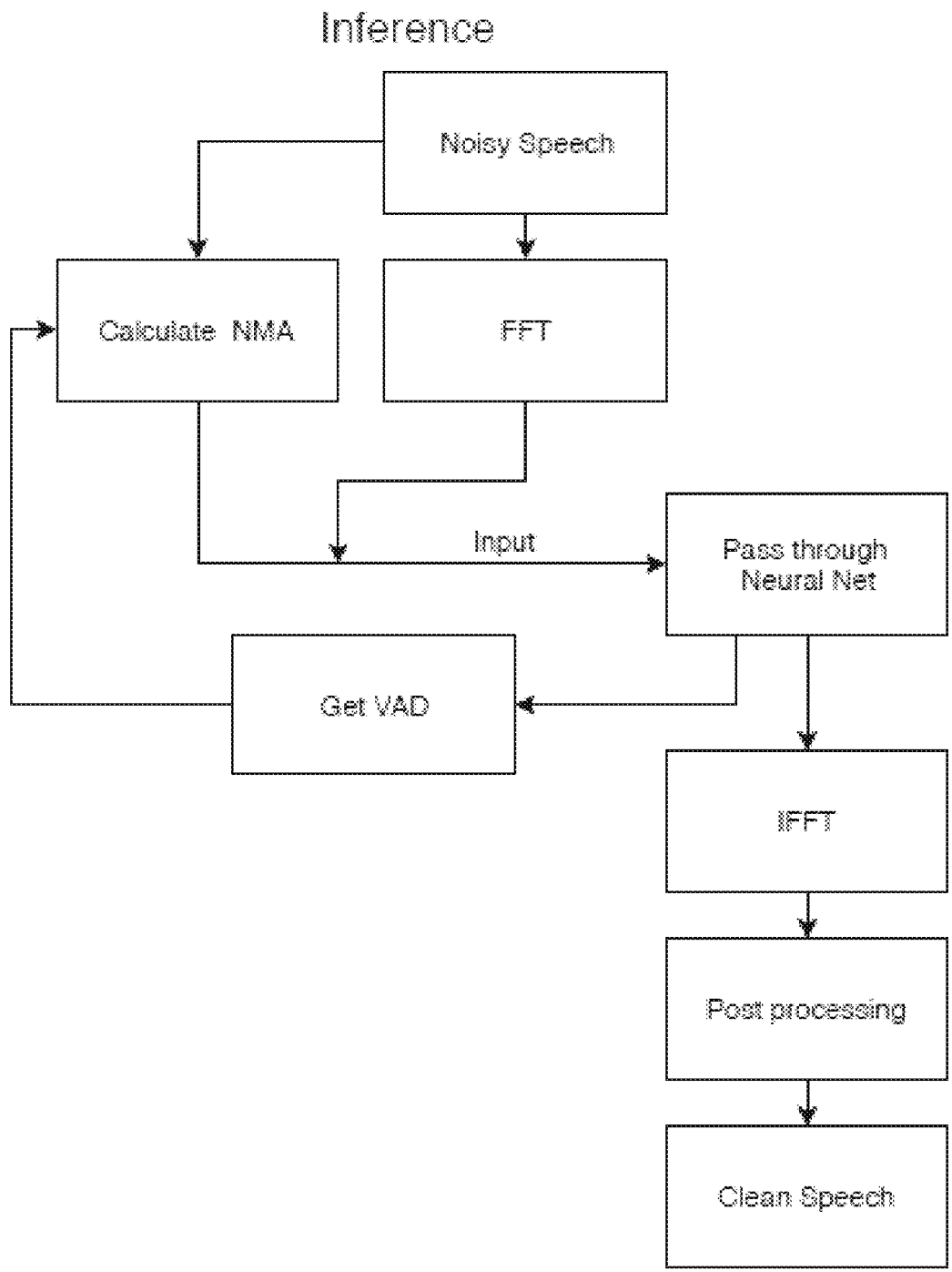

3) Custom VAD (See, for Example, FIGS. 7 and 8).

The difference between this and multitask recursive NMA model is that here the systems and methods use the VAD feature both in train and inference to calculate the NMA more precisely. During data collection prior to train (see train process) the systems and methods extract VAD of clean speech based on k-mean algorithm and use this feature to calculate NMA based on voiceless frames of the mix. During inference, the systems and methods take the VAD output (learned by NN) and recursively updates the NMA as described in the recursive NMA model.

Figure 9:
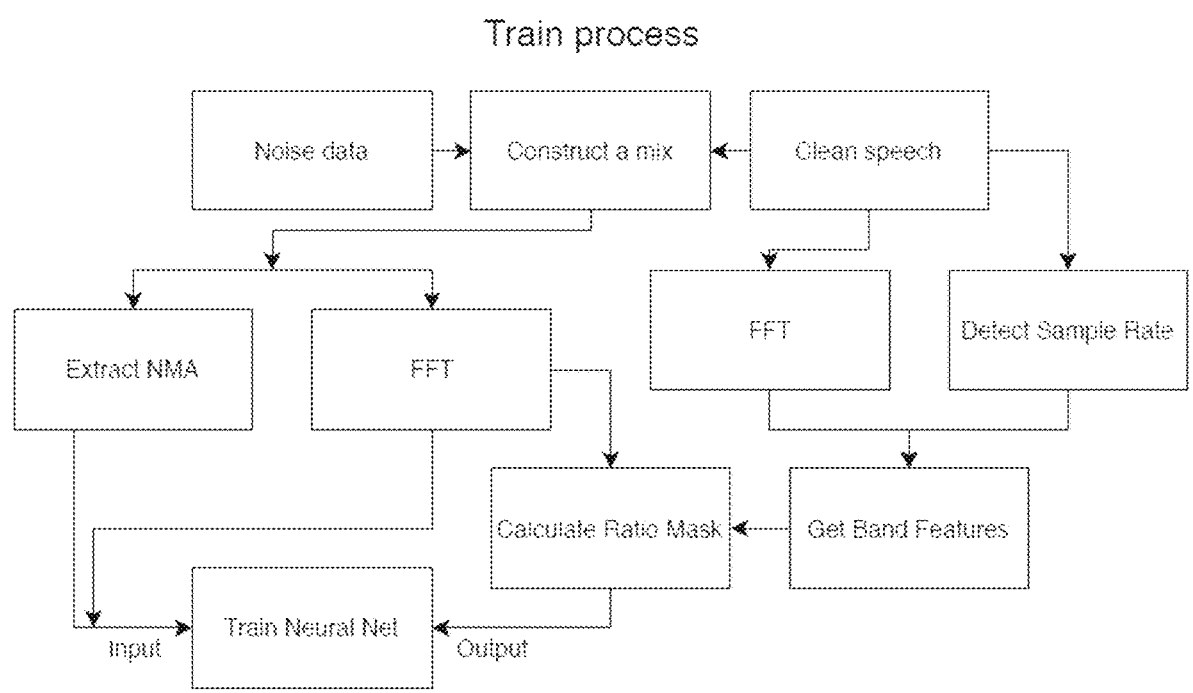
FIGS. 9 and 10 show flow charts for a multi sample rate (SR) model according to some embodiments.
Figure 10:
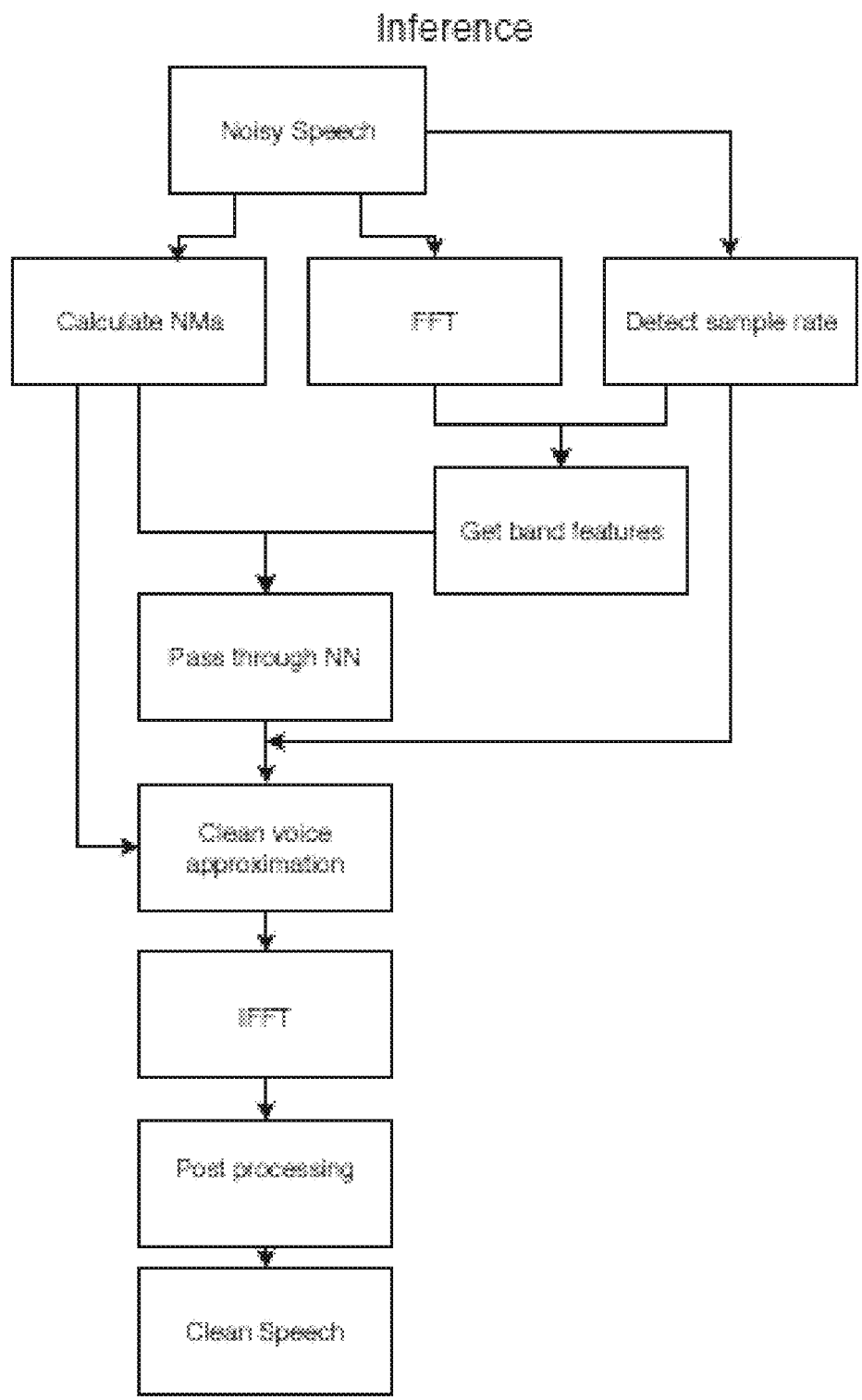

4) Multi SR (See, for Example, FIGS. 9 and 10).

The difference between this and main model is that here the systems and methods train the NN using data of various SRs (sampling rate) and to achieve faster implementation, they use frequency band features. For example, instead of using all frequency bins' Fourier coefficients, the systems and methods select frequency bands and sum squares of amplitudes of Fourier coefficients inside bands which gives band energies. The systems and methods then take a logarithm of band energies and then apply DCT (discrete Fourier transform). The same features are extracted for NMA. And during inference, the systems and methods detect SR, extract features according to SR and proceed with the NN having linear weights and update NMA recursively as described in the main model.

Figure 11:
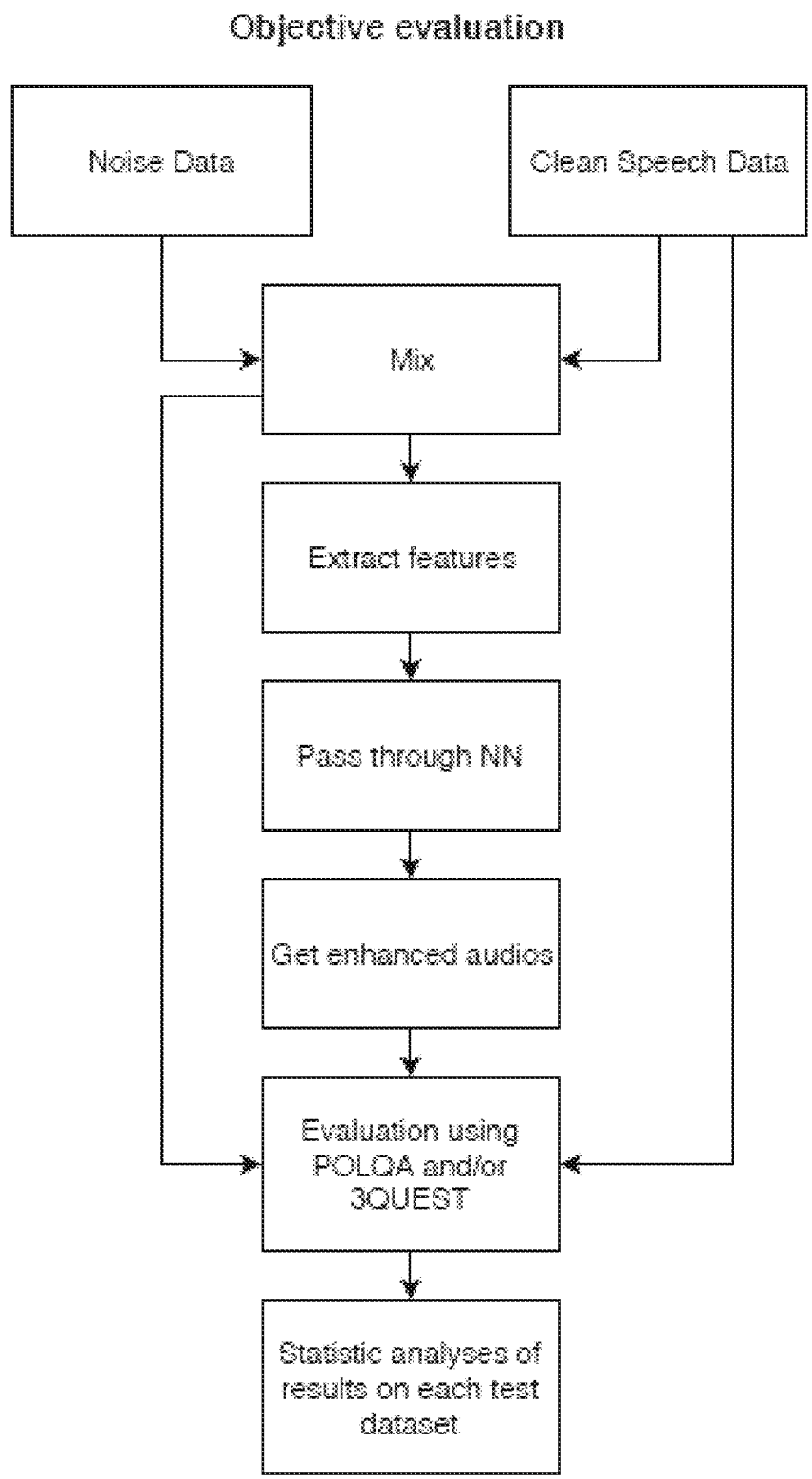
FIGS. 11 and 12 show evaluation metrics for evaluating the performance of models according to some embodiments.
Figure 12:
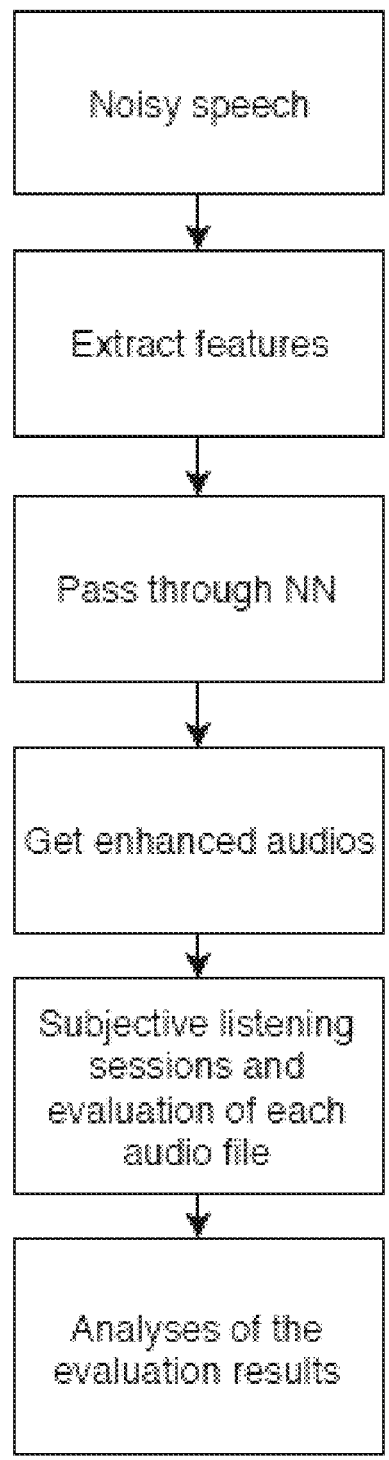

5) Evaluation (See, for Example, FIGS. 11 and 12).

The systems and methods evaluate the overall performance of the models using, for example, the following metrics: STOI (Short-Time Objective Intelligibility), PESQ (perceptual evaluation of speech quality, version ITU-T P.862), SNR (speech to noise ratio), SIR (speech to interference ratio). All of these metrics work based on reference audio (clean speech) and enhanced audio. To give an overall performance measure, the systems and methods calculate mean and standard deviation of scores.

Figure 13:
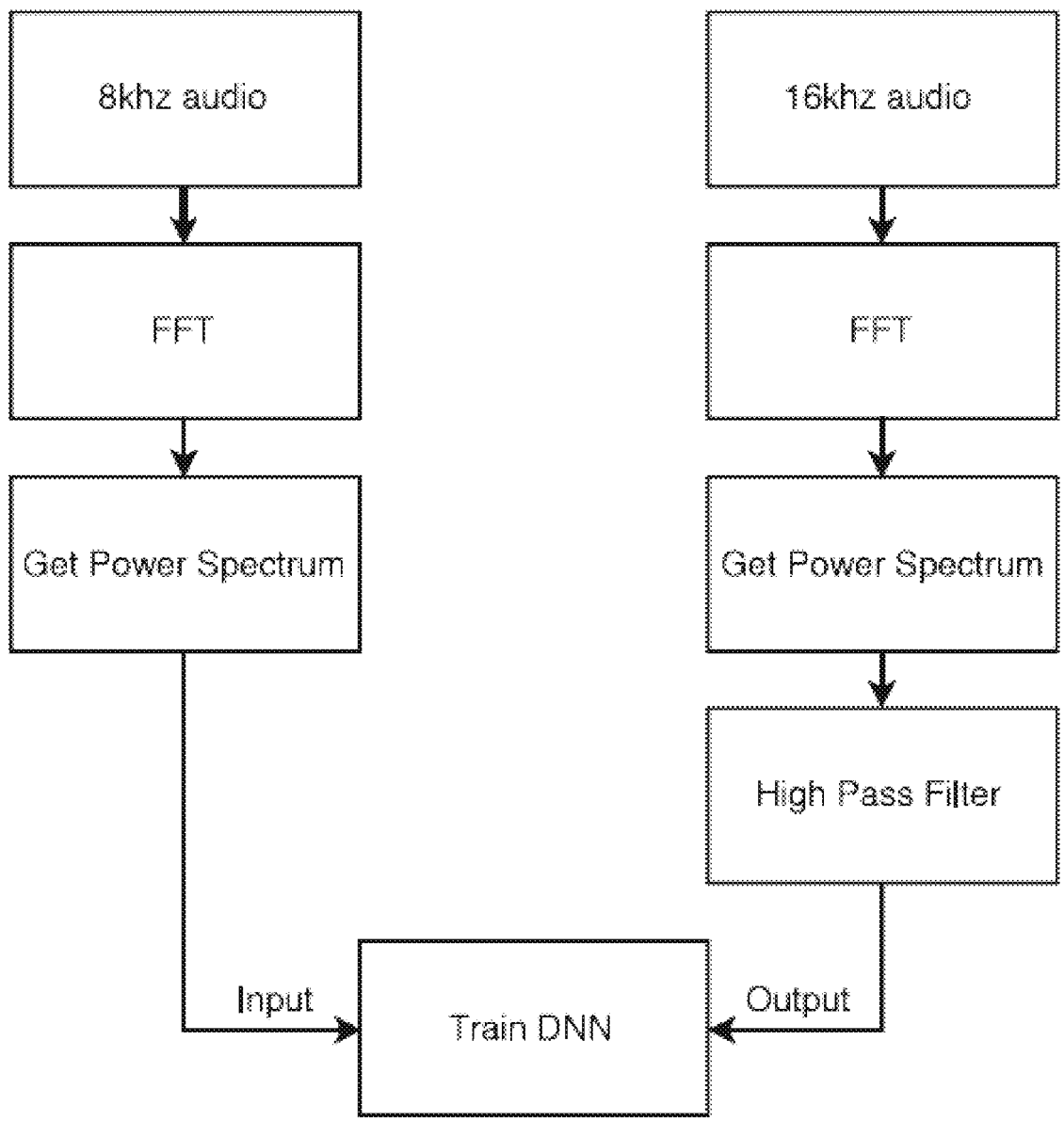
FIGS. 13 and 14 show flow charts for a bandwidth expansion model according to some embodiments.
Figure 14:
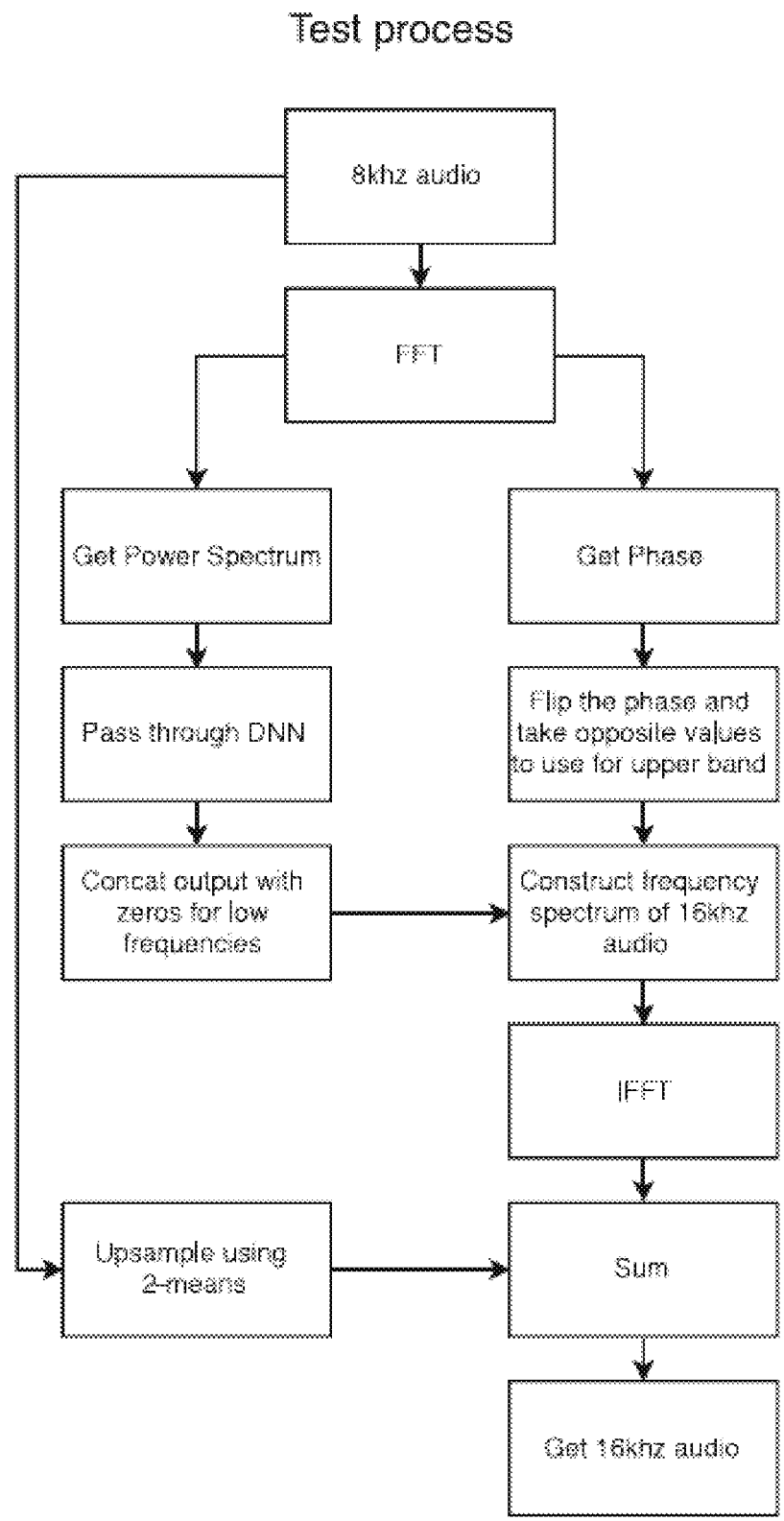

6) Bandwidth Expansion (BE) (See, for Example, FIGS. 13 and 14).

Train process: The systems and methods take a 8 kHz .wav file and calculate its power spectrum and phase of overlapped frames. Overlapping frames allow keeping correlation between neighboring frames. The minimal length of an audio signal that the human ear can differentiate lays between 20 ms to 40 ms. The systems and methods take a 32 ms frame length which is close to the center of this range, and feed the NN with the resulting vectors of Fourier coefficients.

The systems and methods also take LPS features of the above overlapping frames of 8 khz audio as input to NN and respective LPS features of 16 khz version of the same audio, processed by high pass filter (to keep frequency information over 4 khz).

Inference (test process): The described systems and methods construct a wideband audio signal in the following way. Take a narrowband signal which is fed to a NN containing liner weights and up-sample it using traditional methods (2-means in diagram). In parallel, the systems and methods predict an upper band of the same signal with the NN and then compute IFFT (Inverse FFT) to bring signal to the time domain. When doing IFFT, the systems and methods use phases of the original narrowband signal to reconstruct a phase of the wide band signal. Then, the systems and methods simply add them and get a 16 kHz bandwidth expanded audio signal as a result.

The methods disclosed herein can be implemented by a processor. The processor can be a dedicated "hard-wired" device, or it can be a programmable device. For example, it can be, but is not limited to, a personal computer, a work station, or any other suitable electronic device for the particular application. In some embodiments, it can be integrated into a unit or it can be attachable, remote, and/or distributed. A system for speech enhancement and noise suppression may include a processor configured to implement a method for speech enhancement and noise suppression. The system may further include audio input and output devices, as well as a memory for storing audio files and processing and enhancement algorithms and software. The system may include other user input devices, such as a keyboard and display. The system may also have wireless and cellular communication capabilities.

Figure 15:
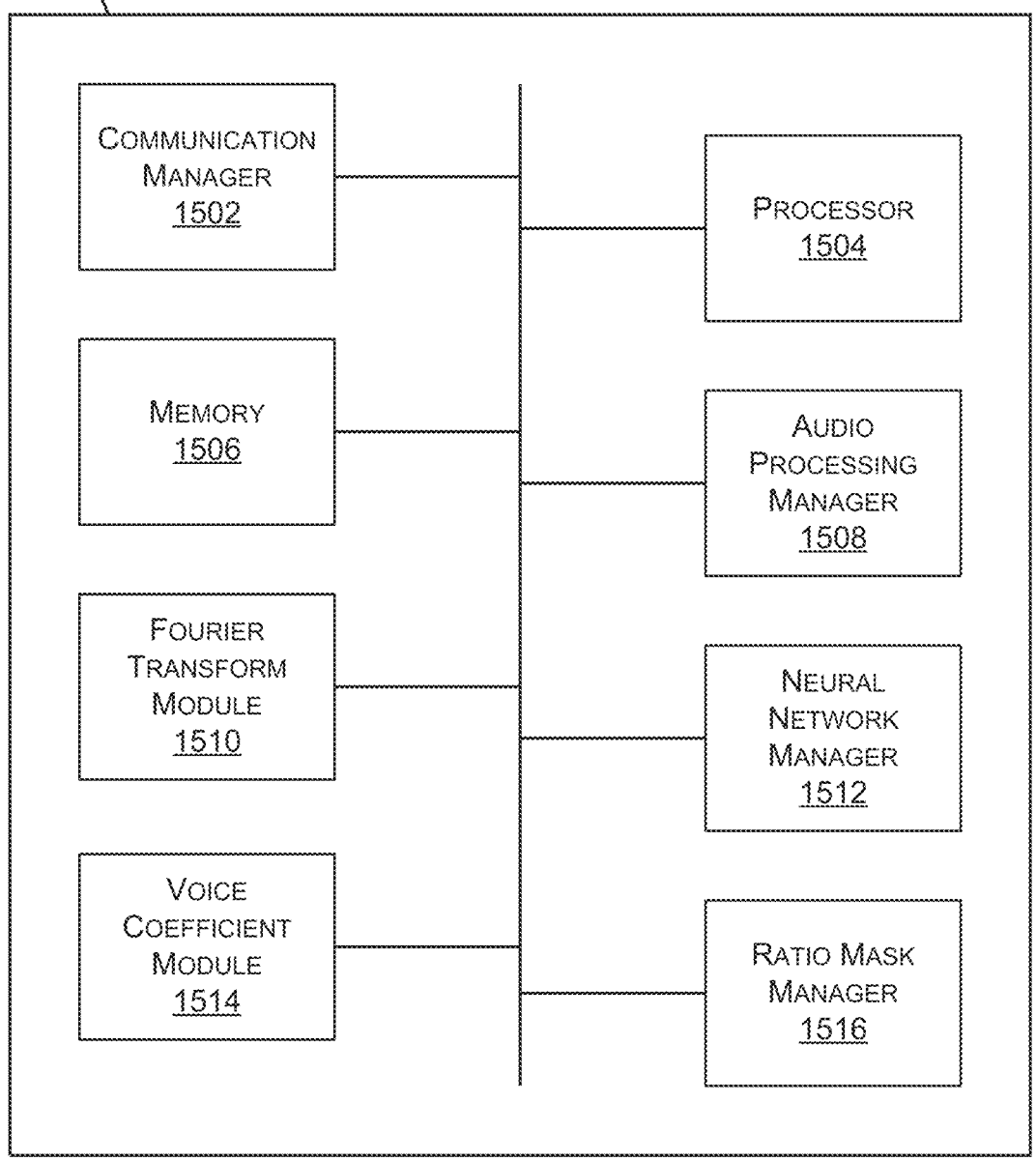
FIG. 15 is a block diagram illustrating an embodiment of a speech enhancement and noise suppression system.

FIG. 15 is a block diagram illustrating an embodiment of a speech enhancement and noise suppression system 1500. As shown in FIG. 15, speech enhancement and noise suppression system 1500 includes a communication manager 1502, a processor 1504, and a memory 1506. Communication manager 1502 allows speech enhancement and noise suppression system 1500 to communicate with other systems and devices. Processor 1504 executes various instructions to implement the functionality provided by speech enhancement and noise suppression system 1500, as discussed herein. Memory 1506 stores these instructions as well as other data used by processor 1504 and other modules and components contained in speech enhancement and noise suppression system 1500.

Speech enhancement and noise suppression system 1500 also includes an audio processing manager 1508 that manages the processing of various audio data and audio signals, as discussed herein. A Fourier transform module 1510 performs Fourier transform procedures as described herein. A neural network manager 1512 manages a variety of functions and operations associated with (and performed by)

neural networks as described in various embodiments herein. A voice coefficient module 1514 calculates and manages a variety of voice coefficients of the type discussed herein. A ratio mask manager 1516 manages various functions associated with generating and applying ratio masks as discussed herein.

Figure 16:
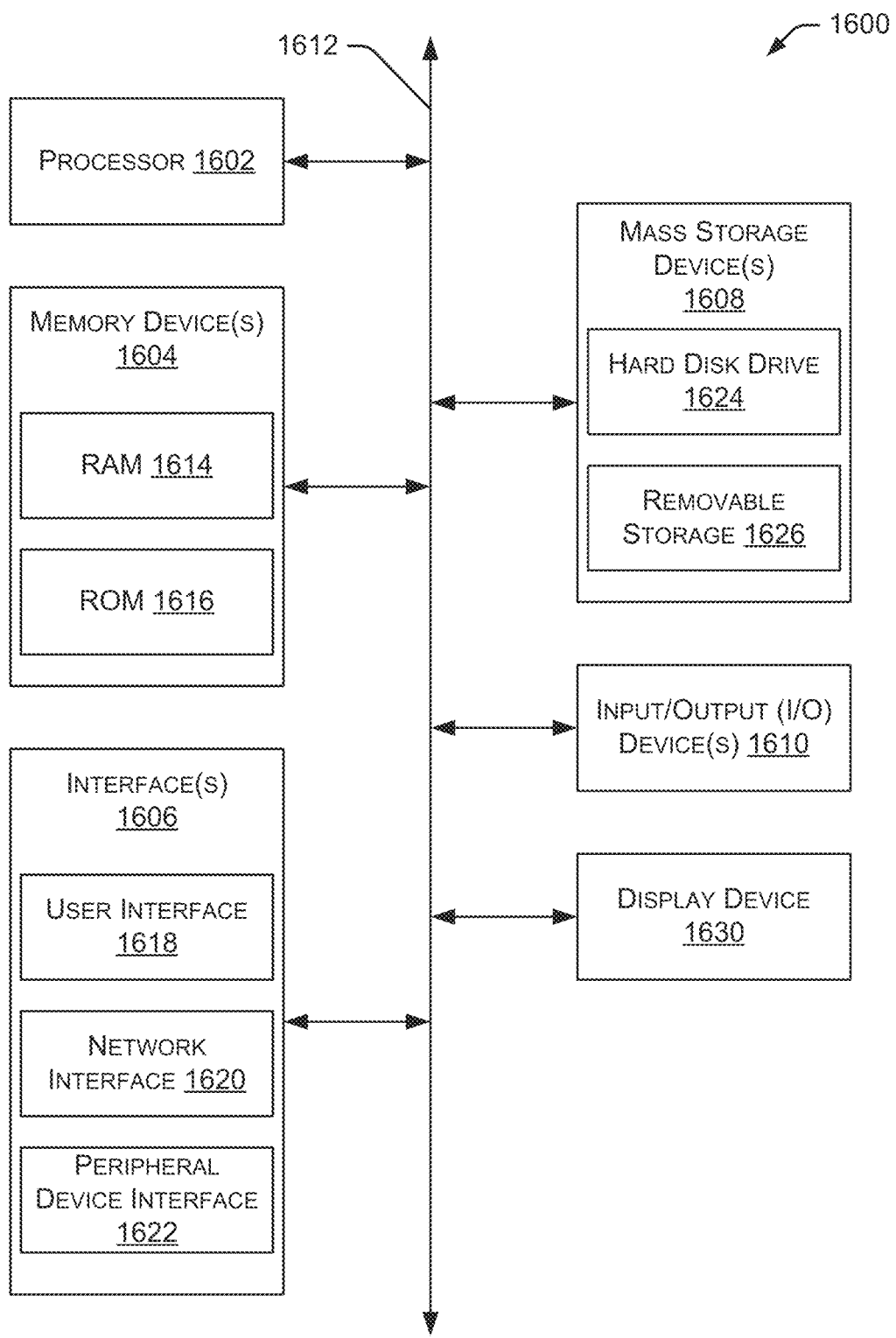
FIG. 16 illustrates an example block diagram of a computing device.

FIG. 16 illustrates an example block diagram of a computing device 1600. Computing device 1600 may be used to perform various methods and procedures, such as those discussed herein. For example, computing device 1600 may perform any of the functions or methods of the computing devices and systems discussed herein. Computing device 1600 can perform various functions as discussed herein, and can execute one or more application programs, such as the application programs or functionality described herein. Computing device 1600 can be any of a wide variety of computing devices, such as a desktop computer, a notebook computer, a server computer, a handheld computer, tablet computer, a wearable device, and the like.

Computing device 1600 includes one or more processor(s) 1602, one or more memory device(s) 1604, one or more interface(s) 1606, one or more mass storage device(s) 1608, one or more Input/Output (I/O) device(s) 1610, and a display device 1630 all of which are coupled to a bus 1612. Processor(s) 1602 include one or more processors or controllers that execute instructions stored in memory device(s) 1604 and/or mass storage device(s) 1608. Processor(s) 1602 may also include various types of computer-readable media, such as cache memory.

Memory device(s) 1604 include various computer-readable media, such as volatile memory (e.g., random access memory (RAM) 1614) and/or nonvolatile memory (e.g., read-only memory (ROM) 1616). Memory device(s) 1604 may also include rewritable ROM, such as Flash memory.

Mass storage device(s) 1608 include various computer readable media, such as magnetic tapes, magnetic disks, optical disks, solid-state memory (e.g., Flash memory), and so forth. As shown in FIG. 16, a particular mass storage device is a hard disk drive 1624. Various drives may also be included in mass storage device(s) 1608 to enable reading from and/or writing to the various computer readable media. Mass storage device(s) 1608 include removable media 1626 and/or non-removable media.

I/O device(s) 1610 include various devices that allow data and/or other information to be input to or retrieved from computing device 1600. Example I/O device(s) 1610 include cursor control devices, keyboards, keypads, microphones, monitors or other display devices, speakers, printers, network interface cards, modems, and the like.

Display device 1630 includes any type of device capable of displaying information to one or more users of computing device 1600. Examples of display device 1630 include a monitor, display terminal, video projection device, and the like.

Interface(s) 1606 include various interfaces that allow computing device 1600 to interact with other systems, devices, or computing environments. Example interface(s) 1606 may include any number of different network interfaces 1620, such as interfaces to local area networks (LANs), wide area networks (WANs), wireless networks, and the Internet. Other interface(s) include user interface 1618 and peripheral device interface 1622. The interface(s) 1606 may also include one or more user interface elements 1618. The interface(s) 1606 may also include one or more peripheral interfaces such as interfaces for printers, pointing devices (mice, track pad, or any suitable user interface now known to those of ordinary skill in the field, or later discovered), keyboards, and the like.

Bus 1612 allows processor(s) 1602, memory device(s) 1604, interface(s) 1606, mass storage device(s) 1608, and I/O device(s) 1610 to communicate with one another, as well as other devices or components coupled to bus 1612. Bus 1612 represents one or more of several types of bus structures, such as a system bus, PCI bus, IEEE bus, USB bus, and so forth.

For purposes of illustration, programs and other executable program components are shown herein as discrete blocks, although it is understood that such programs and components may reside at various times in different storage components of computing device 1600, and are executed by processor(s) 1602. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

The following definitions are provided as examples, and are not intended to limit the scope of the systems and methods described herein.

1. Processing of .wav files—.wav files are not compressed and contain sufficient information for processing.

2. Tests on data expression—the systems and methods use audio spectrograms to visually explore audio data, 32 ms length of frames and 16 ms frame overlapping.

3. 8000 hz—speech spectrum generally is located in 30 to 4000 hz frequencies. Thus recordings with 8000 hz sample rate contain main human voice frequencies.

4. Fourier coefficients—the described systems and methods use Fourier coefficients obtained by fast fourier transform algorithm as audio features.

5. Data collection—collected 65k speeches (in English) and 11k different noises.

6. Neural networks—in the first model, the systems and methods used simple neural networks with sigmoidal non-linearity and 1 or 2 hidden layers architecture.

7. Combination of statistical and machine learning methods—testings showed that enhancing with statistical algorithms along with neural nets leads to better results.

8. Autoencoder implementation—to achieve fast performance, started to use autoencoders that keep 95% of speech data variation and could supply new compressed features of speech.

9. Research of training algorithms—compared different algorithms for neural network parameters update (e.g., Gradient descent, momentum optimizer, LBFGS, ADAM optimizer) and ADAM optimizer shows the best results.

10. 7 overlapping frames data—studies show that for learning speech specifications, neural networks need more data, particularly the systems and methods extract data of the last 7 overlapping frames (time data).

11. Normalizing with speech moments—normalize the train data with mean and variance of feature vectors of clear speech data.

12. Implementation of deep NN-models built with dense deep neural networks with more than 2 hidden layers.

13. Implementation of speech enhancement evaluation scores (benchmarks)—the systems and methods are using PESQ, MOS, STOI, POLQA, SNR, SIR scores to evaluate the model performance and to compare the results with other models.

14. Changing the activation functions—the systems and methods use non ordinary activation of neurons, such as ReLU (rectified linear unit) combined with linear units, with separate non-linear and linear biases.

15. Recurrent neural networks—recurrent neural nets are known to work well on sequential data and the systems and methods have implemented such networks for speech enhancement.

16. Ratio mask vs Binary mask—studies show that ratio masking lead to better performance than binary masking, and the systems and methods started to use ratio masks as output data.

17. Diverse loss functions—use mean square error, sigmoid cross entropy, KL (Kulback Leibler) divergence during training of neural network.

18. Implementation of NAT model—NAT (noise aware training) shows better performance, and the systems and methods have trained the neural networks supplying information on noise model.

19. Along with NMA model, the systems and methods get noise model with K mean algorithm.

20. Smoothing techniques—the systems and methods find out that using smoothed version of neural network output leads to better performance.

21. Big data usage—collected big data of noises and >100 hours training data on that noises. This provides a more generalized model.

22. CRM—the systems and methods made testings on ideal CRM (complex ratio mask) and find out that adding phase information of audio data improves significantly the model performance.

While various embodiments of the present disclosure are described herein, it should be understood that they are presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the described exemplary embodiments, but should be defined only in accordance with the following claims and their equivalents. The description herein is presented for the purposes of illustration and description. It is not intended to be exhaustive or to limit the disclosure to the precise form disclosed. Many modifications and variations are possible in light of the disclosed teaching. Further, it should be noted that any or all of the alternate implementations discussed herein may be used in any combination desired to form additional hybrid implementations of the disclosure.

The invention claimed is:

1. A method of speech enhancement comprising:
receiving an audio file comprising a combination of voice data and noise data;
dividing said audio file into a plurality of frames;
performing a discrete Fourier transform on each frame of a first subset of said plurality of frames to provide a plurality of frequency-domain outputs;
inputting said plurality of frequency-domain outputs of said discrete Fourier transform and a noise model approximation to a neural network;
obtaining a ratio mask as an output from said neural network;
computing clean voice coefficients using said ratio mask; and
outputting an audio file having enhanced speech and suppressed noise based on said computed clean voice coefficients.

2. The method of claim 1, further comprising:
prior to said outputting said audio file having enhanced speech, revising said noise model approximation using said ratio mask to provide a revised noise model approximation for input to said neural network;
performing a discrete Fourier transform on each frame of a second subset of said plurality of frames to provide a second plurality of frequency-domain outputs;
inputting said second plurality of frequency-domain outputs of said discrete Fourier transform and said revised noise model approximation to said neural network;
obtaining a revised ratio mask as an output from said neural network; and
computing clean voice coefficients using said revised ratio mask.

3. The method of claim 2, further comprising:
prior to said outputting said audio file having enhanced speech, revising said revised noise model approximation using said revised ratio mask to provide a second revised noise model approximation for input to said neural network;
performing a discrete Fourier transform on each frame of a third subset of said plurality of frames to provide a third plurality of frequency-domain outputs;
inputting said third plurality of frequency-domain outputs of said discrete Fourier transform and said second revised noise model approximation to said neural network;
obtaining a second revised ratio mask as an output from said neural network; and
computing clean voice coefficients using said second revised ratio mask.

4. The method of claim 1, wherein the neural network is a deep neural network that:
includes more than two hidden layers;
employs rectified linear units in combination with linear units; and
uses linear and non-linear weights.

5. The method of claim 1, further comprising:
training the neural network, comprising:
constructing mixed data by mixing the predefined noise data and clean speech data;
dividing the mixed data into a plurality of frames;
dividing the clean speech data into a corresponding plurality of frames;
identifying a first subset of the plurality of frames of the mixed data, the first subset including a randomly chosen frame and a first plurality of frames immediately preceding the randomly chosen frame;
identifying a corresponding first subset of the plurality of frames of the clean speech data;
performing a discrete Fourier transform for the first subset of the plurality of frames of the mixed data and the corresponding first subset of the plurality of frames of the clean speech data to obtain mixed data frequency-domain outputs and clean speech data frequency-domain outputs for each frame;
calculating the known ratio mask for one frame of the plurality of frames of the mixed data based on the mixed data frequency-domain outputs and the clean speech data frequency-domain outputs and
using the known ratio mask as an output for the neural network during training.

6. The method of claim 5, wherein training the neural network further comprises:
identifying a second subset of the plurality of frames of the mixed data, the second subset including a second plurality of frames;

performing a discrete Fourier transform for the second plurality of frames to obtain frequency-domain outputs for each frame of the second subset;

calculating a noise model approximation based on the frequency-domain outputs for each frame of the second subset;

combining the mixed data frequency-domain outputs for the first subset with the noise model approximation to create an input matrix; and using the input matrix as an input for the neural network during training.

7. The method of claim 1, further comprising training the neural network using a gradient descent algorithm and mean square error as a loss function.

8. The method of claim 1, further comprising:
determining, for each of the plurality of temporally overlapping frames of clean speech data, whether the frame includes voice activity; and
only using frames of clean speech data that do not include voice activity to calculate the noise model approximation during training of the neural network.

9. The method of claim 1, further comprising:
obtaining a voice activity detection parameter as an output from the neural network; and
revising said noise model based on said voice activity detection parameter.

10. The method of claim 5, wherein training the neural network comprises constructing mixed data by mixing noise data and clean speech data having a plurality of sampling rates.

11. The method of claim 10, further comprising:
detecting a sample rate from the clean speech data;
extracting features of the clean speech data based on the detected sampling rate; and
calculating the known ratio mask based on the extracted features.

12. The method of claim 11, wherein the noise model approximation process further comprises:
detecting a sample rate of the combination of voice data and noise data; and
after performing a discrete Fourier transform on each frame of said plurality of frames to provide said plurality of frequency-domain outputs, selecting a subset of said plurality of frequency-domain outputs based on said detected sample rate; and
inputting said subset of frequency-domain outputs and said noise model approximation to said neural network.

13. The method of claim 1, wherein said neural network contains a structure and parameters based on a previous training using predefined noise data and clean speech data to result in a known ratio mask.

14. A method of bandwidth expansion, comprising:
receiving an audio file comprising a combination of voice data and noise data having a first bandwidth;
dividing said audio file into a plurality of frames;
for a first frame of said plurality of frames, performing a bandwidth expansion process comprising:
performing a fast Fourier transform to obtain audio features corresponding to the combination of voice data and noise data;
obtaining a power spectrum of the audio features;
inputting the power spectrum to a neural network;
determining a phase of the audio features;
constructing a frequency spectrum having a second bandwidth based on an output of the neural network and the determined phase, the second bandwidth being greater than the first bandwidth; and
taking an inverse fast Fourier transform of the frequency spectrum to provide an audio signal;
repeating said bandwidth expansion process for a subsequent frame of said plurality of frames; and
outputting an audio file having the second bandwidth based on the audio signals for the plurality of frames.

15. The method of claim 14, further comprising:
training the neural network, comprising:
obtaining a first sample of an audio file and a second sample of the audio file, the first sample having a first frequency bandwidth and the second sample having a second frequency bandwidth, the second frequency bandwidth being larger than the first frequency bandwidth;
dividing the first sample and the second sample into a plurality of frames;
performing a fast Fourier transform for the plurality of frames of the first sample to obtain first audio features;
performing a fast Fourier transform for the plurality of frames of the second sample to obtain second audio features;
using a high pass filter to remove audio features within the first frequency bandwidth from the second audio features, resulting in filtered second audio features; and
using the first audio features as an input and the filtered second audio features as an output for the neural network during training.

16. A speech enhancement system comprising:
a processor; and
a memory device coupled to the processor, the memory device configured to store instructions for execution on the processor, the instructions causing the processor to:
receive an audio file comprising a combination of voice data and noise data;
divide said audio file into a plurality of frames;
perform a discrete Fourier transform on each frame of a first subset of said plurality of frames to provide a plurality of frequency-domain outputs;
input said plurality of frequency-domain outputs of said discrete Fourier transform and a noise model approximation to a neural network;
obtain a ratio mask as an output from said neural network;
compute clean voice coefficients using said ratio mask; and
output an audio file having enhanced speech and suppressed noise based on said computed clean voice coefficients.

17. The speech enhancement system of claim 16, wherein the instructions further cause the processor to:
prior to said outputting said audio file having enhanced speech, revise said noise model approximation using said ratio mask to provide a revised noise model approximation for input to said neural network;
perform a discrete Fourier transform on each frame of a second subset of said plurality of frames to provide a second plurality of frequency-domain outputs;
input said second plurality of frequency-domain outputs of said discrete Fourier transform and said revised noise model approximation to said neural network;
obtain a revised ratio mask as an output from said neural network; and
compute clean voice coefficients using said revised ratio mask.

18. The speech enhancement system of claim 16, wherein the instructions further cause the processor to:

prior to said outputting said audio file having enhanced speech, revise said revised noise model approximation using said revised ratio mask to provide a second revised noise model approximation for input to said neural network;

perform a discrete Fourier transform on each frame of a third subset of said plurality of frames to provide a third plurality of frequency-domain outputs;

input said third plurality of frequency-domain outputs of said discrete Fourier transform and said second revised noise model approximation to said neural network;

obtain a second revised ratio mask as an output from said neural network; and compute clean voice coefficients using said second revised ratio mask.

19. The speech enhancement system of claim 16, wherein the instructions further cause the processor to:

train the neural network using a gradient descent algorithm and mean square error as a loss function.

20. The speech enhancement system of claim 16, wherein said neural network contains a structure and parameters based on a previous training using predefined noise data and clean speech data to result in a known ratio mask.

\* \* \* \* \*